Patented Sept. 13, 1949

2,482,038

UNITED STATES PATENT OFFICE 2,482,038

VINYL CHLORIDE-CONTAINING POLYMERS HAVING A HIGH STABILITY AGAINST THERMAL DECOMPOSITION

Sterling Temple, Niagara Falls, N. Y., assignor to E. I. du Pont de Nemours & Company, Wilmington, Del., a corporation of Delaware No Drawing. Application March 11, 1947, Serial No. 733,997

6 Claims. (Cl. 260—92.8)

This invention relates to the production of vinyl chloride-containing polymers and, more particularly, it relates to a new and improved process for the production of such polymers having a highly desirable stability against thermal decomposition.

This invention is particularly applicable to vinyl chloride-containing polymers containing at least 50%, by weight, vinyl chloride ($CH_2=CHCl$) units, i. e., polymers obtained by the polymerization solely of vinyl chloride (commonly referred to as polyvinyl chloride) and polymers obtained by the conjoint polymerization of vinyl chloride and another polymerizable substance and in which the vinyl chloride constitutes 50%, by weight, of the resulting copolymer.

This application is a continuation-in-part of my copending application Serial No. 563,305, filed November 13, 1944, now abandoned.

Vinyl chloride-containing polymers containing at least 50% by weight of vinyl chloride units are subject to thermal decomposition when heat processed above the melting point thereof in the formation of various articles, for example, when heat molded, injection molded, heat calendared, and the like. These polymers are particularly subject to thermal decomposition, as evidenced by discoloration, when they contain even trace amounts of certain metal salts, particularly iron salts.

In the production of vinyl chloride-containing polymers by the aqueous emulsion method, it is common practice to coagulate the dispersed polymer by the addition of a metal salt electrolyte, for example, an aluminum salt, then separate the polymers from the aqueous phase by filtration, wash thoroughly, and dry under a reduced pressure and elevated temperature. Polymers made in this manner are usually contaminated with impurities, notably among which are iron salts, which intensify their inherent instability. These impurities may be present as a result of contact of the polymer with polymerization or processing equipment, or may be added with water used in producing the polymer.

It is an object of this invention to provide a process for the production of vinyl chloride-containing polymers containing at least 50% by weight vinyl chloride units, which polymers will have an improved stability against thermal decomposition.

It is another object of this invention to provide a process of treating an aqueous dispersion of a vinyl chloride-containing polymer to reduce its content of impurities, particularly iron salt impurities.

It is a further object of this invention to produce a vinyl chloride-containing polymer by the aqueous emulsion polymerization process which will have good thermal stability.

It is still another object to provide a process for treating an aqueous dispersion of a vinyl chloride-containing polymer which will solubilize inorganic impurities therein and permit their removal by washing with water.

Other objects of the invention will appear hereinafter.

The objects of this invention may be accomplished in general by adding to an aqueous dispersion of a vinyl chloride-containing polymer between 0.01% and 0.5% (based on the weight of the dispersion) of a compound taken from the group consisting of sodium pyrophosphate and sodium hexametaphosphate, and then coagulating the polymer in the liquid by addition of a metal salt electrolyte. These phosphates will deactivate the iron salt impurities. The iron complexes formed by reaction with these phosphates are water-soluble and can be removed by washing. Traces of these complex salts remaining in the polymer will not materially affect the thermal stability of the polymers.

In coagulating the polymers by the addition of the electrolyte, a portion of the complex iron-phosphate ions may be reconverted to harmful iron salt which will lower the thermal stability of the polymer. It is, therefore, preferred, where it is desired to remove a higher percentage of the harmful iron salt, that the dispersion of vinyl chloride-containing polymer to which the phosphate has been added be acidified by the addition of an acid in insufficient amount to coagulate the dispersion but in sufficient amount to lower the pH value below 2 whereby the metallic salt will remain in aqueous solution during the coagulation of the polymer with the electrolyte and may be removed by washing with water or other aqueous liquid.

If the process is carried out with the above-described step of acidification it will, of course, be necessary that the aqueous vinyl chloride-containing dispersion contain, as the dispersing agent therein, a dispersing agent which is not materially affected by the step of acidification to demulsify the dispersion, i. e., the dispersing agent must be stable against decomposition at a pH below 2. As examples of such dispersing agents, the following may be named: sodium alkyl sulfates containing 7 to 18 carbon atoms, for example, sodium lauryl sulfate, sodium cetyl sulfate or sodium myristyl sulfate; sodium alkyl sulfonates, i. e., compounds having the general formula

in which R designates an alkyl radical having between 12 and 18 carbon atoms.

The acid used in lowering the pH value of the aqueous polymer dispersion should, of course, be sufficiently strong to readily lower the pH value below 2. For example, hydrochloric acid, sulfuric acid, acetic acid, or para-toluene sulfonic acid may be used for this purpose. Preferably, hydrochloric or sulfuric acid is used. Aqueous dispersions of vinyl chloride-containing polymers are usually prepared by methods which will produce dispersions having a pH value of between 2.5 and 4.0. With such dispersions, the acid can be added to lower the pH value to around zero without coagulating the polymer. However, in the case of aqueous dispersions having a high pH value, for example, 6 to 10, the pH value may only be lowered to about 1.0 or even 1.5 to avoid precipitating the polymer.

As the water-soluble metal salt electrolyte, any metal salt may be used which will not form an insoluble salt with acid which is present in the dispersion. For example, aluminum chloride, aluminum sulfate, sodium chloride, potassium chloride or sodium or potassium acetate may be used for this purpose. Water-soluble aluminum salts are preferred. When the dispersion contains sulfate ions, salts such as barium or calcium cannot, of course, be used since they would form insoluble salts in the mass.

The invention is applicable to vinyl chloride polymers consisting entirely of vinyl chloride units, i. e., polyvinyl chloride, or it is applicable to copolymers and interpolymers in which at least 50% of the polymer consists of vinyl chloride units and the remainder consists of other polymer units. As examples of copolymers which will be stabilized in accordance with the present invention, the following may be named: vinyl chloride-fumaric ester copolymers, vinyl chloride-vinyl acetate copolymers, vinyl chloride-vinylidene chloride copolymers, vinyl chloride-vinyl cyanide copolymers, vinyl chloride-acrylic ester copolymers and vinyl chloride-methacrylic ester copolymers. Preferably, the polymers to be treated in accordance with this invention are those prepared from monomers which contain only one ethylenic double bond.

The following examples are given to illustrate certain preferred methods for practicing the process of this invention and to illustrate the desired results to be accomplished thereby. It is to be understood, of course, that the invention is not to be limited by the specific details set forth in these examples.

*Example I*

To 500 grams of a 40% solids, aqueous dispersion of a vinyl chloride-diethyl fumarate copolymers (95% vinyl chloride-5% diethyl fumarate) containing, as the dispersing agent, sodium white oil sulfonate 4% by weight of the polymer, is slowly added, while stirring, 0.5 gram sodium pyrophosphate in 50 cc. H₂O. Straining the dispersion at this point revealed no coagulated resin. 5.0 N. hydrochloric acid was then added until the pH of the dispersion was 1.5. Then, 10 cc. xylene emulsified in 50 cc. H₂O was stirred in the dispersion for the purpose of obtaining an easily filterable granular product upon subsequent coagulation. One (1.0) gram of aluminum sulfate in 9 cc. of H₂O was then stirred into the dispersion which caused a coagulation of the polymer and set the mass to a cottage cheese consistency. After dilution of the mass to a workable slurry, live steam was run in to raise the temperature of the mass to between 80° C. and 90° C. Cool water was then added to cool the mass to 50° C., or below, and the solids filtered off, washed with water, and dried at 65° C. for eight hours. The dry polymer was broken up into the form of a powder which was pressed at 165° C. between metal plates at 1000 pounds per square inch for two minutes. The resulting molding was clear and had a light straw yellow color.

*Example II*

The procedure outlined in Example I was followed with the exception that neither the sodium pyrophosphate nor the hydrochloric acid was added to the dispersion. A molding made with the resultant material was greenish and had darker green blotches.

*Example III*

The procedure outlined in Example I was repeated with the exception that instead of adding sodium pyrophosphate and hydrochloric acid to the dispersion, sufficient ammonium hydroxide was added to impart a pH value of 10.0 to the dispersion. A molding made with the resultant material was deep brown in color and somewhat hazy in appearance.

*Example IV*

To 500 grams of a 35% solids, aqueous polyvinyl chloride dispersion, containing as the dispersing agent sodium lauryl sulfate 1.5% by weight of the polymer, is slowly added, with stirring, 0.5 gram sodium pyrophosphate in 50 cc. H₂O. 5.0 N. hydrochloric acid was slowly added until the pH of the dispersion was 1.4. Then, 10 cc. xylene emulsified in 50 cc. H₂O was added to the dispersion. The polymer was coagulated by the addition of 1.0 gram aluminum sulfate in 9 cc. of H₂O. After diluting the coagulated mass with water to produce a workable slurry, live steam was passed into the mass to heat the same to a temperature of about 85° C. Cool water was then added to lower the temperature to 45° C., the solids filtered off, washed, and dried at 65° C. for eight hours. The dry polymer was powdered and molded by pressing between metal plates at a temperature of 165° C., and a pressure of 1000 pounds per square inch for two minutes. The resulting molding was light yellow in color and quite clear.

*Example V*

The procedure of Example IV was repeated with the exception that no sodium pyrophosphate nor hydrochloric acid was added to the polymer dispersion. The resulting dry polymer, when molded in accordance with the process of Example IV, yielded a reddish brown product.

*Example VI*

The procedure of Example IV was repeated with 500 grams of a 40% solids, aqueous dispersion of 95% vinyl chloride-5% diethyl fumarate copolymer containing, as a dispersing agent, sodium white oil sulfonate 4% by weight of the copolymer, 0.5 gram sodium hexametaphosphate in 50 cc. H₂O, 0.1 N. hydrochloric acid, and 1.0 gram aluminum sulfate in 9 cc. H₂O. The resulting molded polymer had a light straw yellow color.

The present invention provides a simple, easily workable process for the stabilization of vinyl chloride-containing polymers against thermal decomposition. By the treatment of aqueous dispersions of vinyl chloride-containing polymers in accordance with this invention, the resulting polymers can be heat molded or calendared to produce desired articles which are clear and but very slightly discolored.

Throughout the specification and claims, reference to parts, proportions and percentages refers to parts, proportions and percentages by weight unless otherwise specified.

Since it is obvious that many changes and modifications can be made in the above-described details without departing from the spirit and scope of the invention, it is to be understood that the invention is not to be limited by said details except as set forth in the appended claims.

What is claimed is:

1. The process of producing a vinyl chloride-containing polymer having a high stability against thermal decomposition which comprises adding to an aqueous dispersion of a vinyl chloride-containing polymer taken from the group consisting of polyvinyl chloride, vinyl chloride-fumaric ester copolymers, vinyl chloride-vinyl acetate copolymers, vinyl chloride-vinylidene chloride copolymers, vinyl chloride-vinyl cyanide copolymers, vinyl chloride-acrylic ester copolymers, and vinyl chloride-methacrylic ester copolymers, said polymer containing at least 50%, by weight, vinyl chloride units, from 0.01% to 0.5%, by weight, of a compound taken from the group consisting of sodium pyrophosphate and sodium hexametaphosphate, and coagulating said polymer by addition of a water-soluble metal salt.

2. A process of producing polyvinyl chloride which has a high stability against thermal decomposition which comprises adding to an aqueous dispersion of said polyvinyl chloride from 0.01% to 0.5%, by weight, of a compound taken from the group consisting of sodium pyrophosphate and sodium hexametaphosphate, and coagulating said polymer by addition of a water-soluble metal salt.

3. The process of producing a vinyl chloride-containing polymer having a high stability against thermal decomposition which comprises adding to an aqueous dispersion of a vinyl chloride-containing polymer taken from the group consisting of polyvinyl chloride, vinyl chloride-fumaric ester copolymers, vinyl chloride-vinyl acetate copolymers, vinyl chloride-vinylidene chloride copolymers, vinyl chloride-vinyl cyanide copolymers, vinyl chloride-acrylic ester copolymers, and vinyl chloride-methacrylic ester copolymers, said polymer containing at least 50%, by weight, vinyl chloride units and containing as the dispersing means therein a dispersing agent which is stable at a pH below 2.0, from 0.01% to 0.5%, by weight, of a compound taken from the group consisting of sodium pyrophosphate and hexametaphosphate, adding sufficient acid taken from the group consisting of hydrochloric acid, sulfuric acid, acetic acid, and para-toluene sulfonic acid to said dispersion to lower the pH to less than 2.0, coagulating said polymer by addition of a water-soluble metal salt, and washing the same with an aqueous medium.

4. The process of producing polyvinyl chloride having a high stability against thermal decomposition, which comprises adding to an aqueous dispersion of polyvinyl chloride containing as the dispersing means a dispersing agent which is stable at a pH below 2.0, from 0.01% to 0.5%, by weight, of a compound taken from the group consisting of sodium pyrophosphate and sodium hexametaphosphate, adding sufficient acid taken from the group consisting of hydrochloric acid, sulfuric acid, acetic acid, and para-toluene sulfonic acid to said dispersion to lower the pH to less than 2.0, coagulating said polyvinyl chloride by addition of a water-soluble metal salt, and washing the same with an aqueous medium.

5. The process of producing vinyl chloride-containing polymer having a high stability against thermal decomposition which comprises adding to an aqueous dispersion of a vinyl chloride-containing polymer taken from the group consisting of polyvinyl chloride, vinyl chloride-fumaric ester copolymers, vinyl chloride-vinyl acetate copolymers, vinyl chloride-vinylidene chloride copolymers, vinyl chloride-vinyl cyanide copolymers, vinyl chloride-acrylic ester copolymers, and vinyl chloride-methacrylic ester copolymers, said polymer containing at least 50%, by weight, vinyl chloride units and containing as the dispersing means therein a dispersing agent which is stable at a pH below 2.0, from 0.01% to 0.5%, by weight, of a compound taken from the group consisting of sodium pyrophosphate and sodium hexametaphosphate, adding sufficient hydrochloric acid to said dispersion to lower the pH to less than 2.0, coagulating said polymer by addition of a water-soluble metal salt, and washing the same with an aqueous medium.

6. The process of producing polyvinyl chloride having a high stability against thermal decomposition, which comprises adding to an aqueous dispersion of polyvinyl chloride containing as the dispersing means a dispersing agent which is stable at a pH below 2.0, from 0.01% to 0.5%, by weight, of a compound taken from the group consisting of sodium pyrophosphate and sodium hexametaphosphate, adding sufficient hydrochloric acid to said dispersion to lower the pH to less than 2.0, coagulating said polymer by addition of a water-soluble metal salt, and washing the same with an aqueous medium.

STERLING TEMPLE.

REFERENCES CITED

The following references are of record in the file of this patent:

UNITED STATES PATENTS

| Number | Name | Date |
|---|---|---|
| 2,366,306 | Alexander | Jan. 2, 1945 |
| 2,382,812 | Parker | Aug. 14, 1945 |
| 2,419,122 | Cox | Apr. 15, 1947 |